July 25, 1950

H. W. DIETERT ET AL 2,516,188

PERMEABILITY METER

Filed April 7, 1947

INVENTORS
HARRY W. DIETERT
BY RALPH E. STEINMUELLER
CARL M. KING

ATTORNEYS

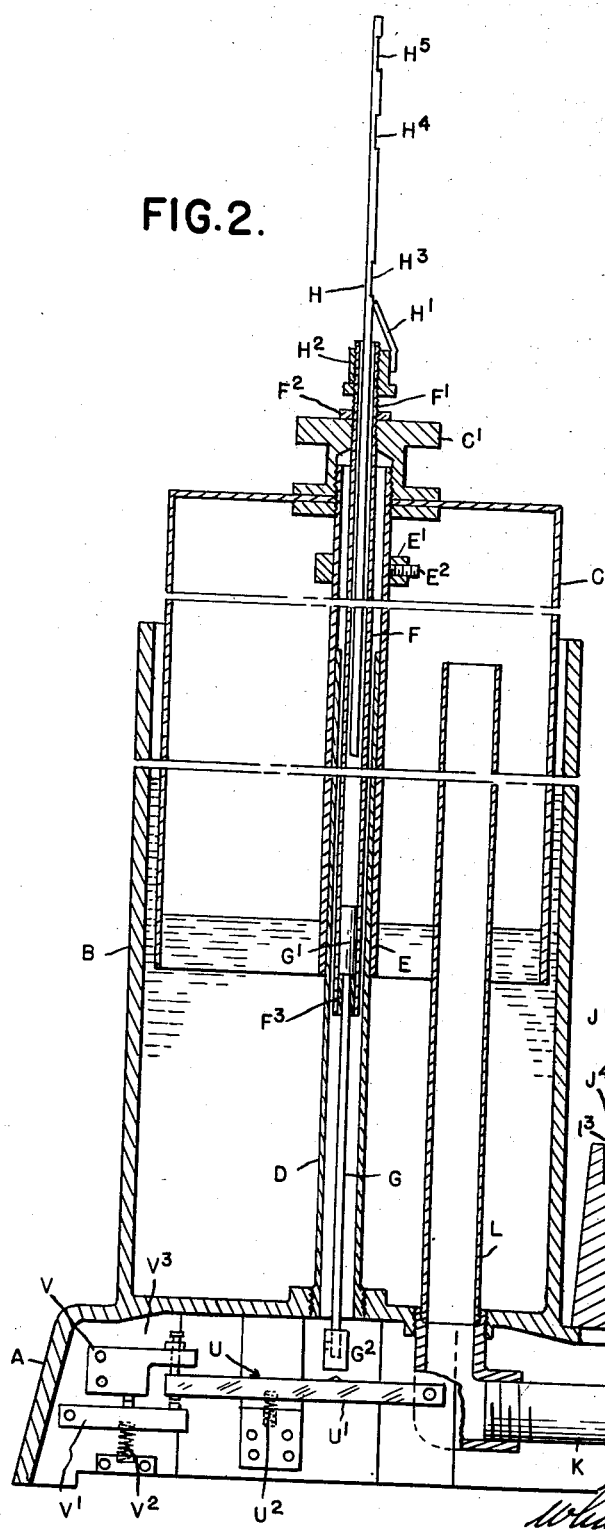
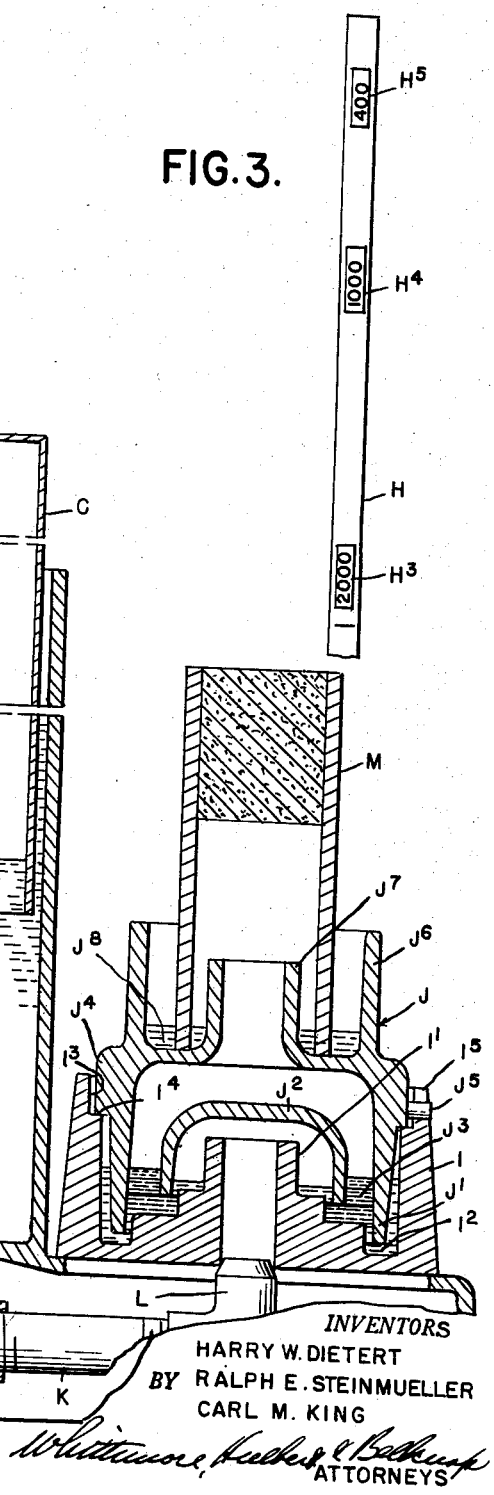

July 25, 1950  H. W. DIETERT ET AL  2,516,188
PERMEABILITY METER
Filed April 7, 1947  4 Sheets-Sheet 3

INVENTORS
HARRY W. DIETERT
BY RALPH E. STEINMUELLER
CARL M. KING

ATTORNEYS

Patented July 25, 1950

2,516,188

UNITED STATES PATENT OFFICE 2,516,188

PERMEABILITY METER

Harry W. Dietert, Ralph E. Steinmueller, and Carl M. King, Detroit, Mich., assignors, by direct and mesne assignments, to Harry W. Dietert Company, Detroit, Mich., a corporation of Michigan Application April 7, 1947, Serial No. 739,920

7 Claims. (Cl. 73—38)

1

The invention relates to instruments for testing the porosity or permeability of molding sand and similar materials to the passage of air or gas. It is a primary object of the invention to obtain a metering means by which a direct reading may be taken indicating the degree of permeability in standard units. This avoids the necessity of any calculation on the part of the tester and thereby eliminates possible errors.

It is a further object to obtain a construction having various advantageous features and to this end the invention consists first in a construction in which a predetermined body of air or gas under a predetermined pressure is passed through the porous sample to be tested and the time required for its passage accurately measured. Second, in a construction in which the timing mechanism operates a meter calibrated in standard units of permeability. Third, in a construction in which the timing means is driven by a synchronous electric motor together with means for starting and stopping said motor, respectively, immediately before and after the passage through the sample of a predetermined volume of air. The invention further consists in various features of construction as hereinafter set forth.

In the drawings:

Fig. 2 is a vertical central section through the gasometer and controlling valve;

Fig. 3 is an elevation of the adjustable rod for the gasometer;

Heretofore permeability meters have been constructed in which air forced through the sample to be tested is supplied by a gasometer which maintains a substantially constant pressure. With the instant invention this same means for suplying air under constant pressure is preferably employed but any other satisfactory means for performing such function might be substituted therefor. The essential feature is the accurate measurement of the time interval required for the passage of a predetermined volume of air through the sample. A further essential feature is the operating of a meter by the

2 timing means, the indicator of which is calibrated in standard units of permeability measurement.

Gasometer

Figure 1:
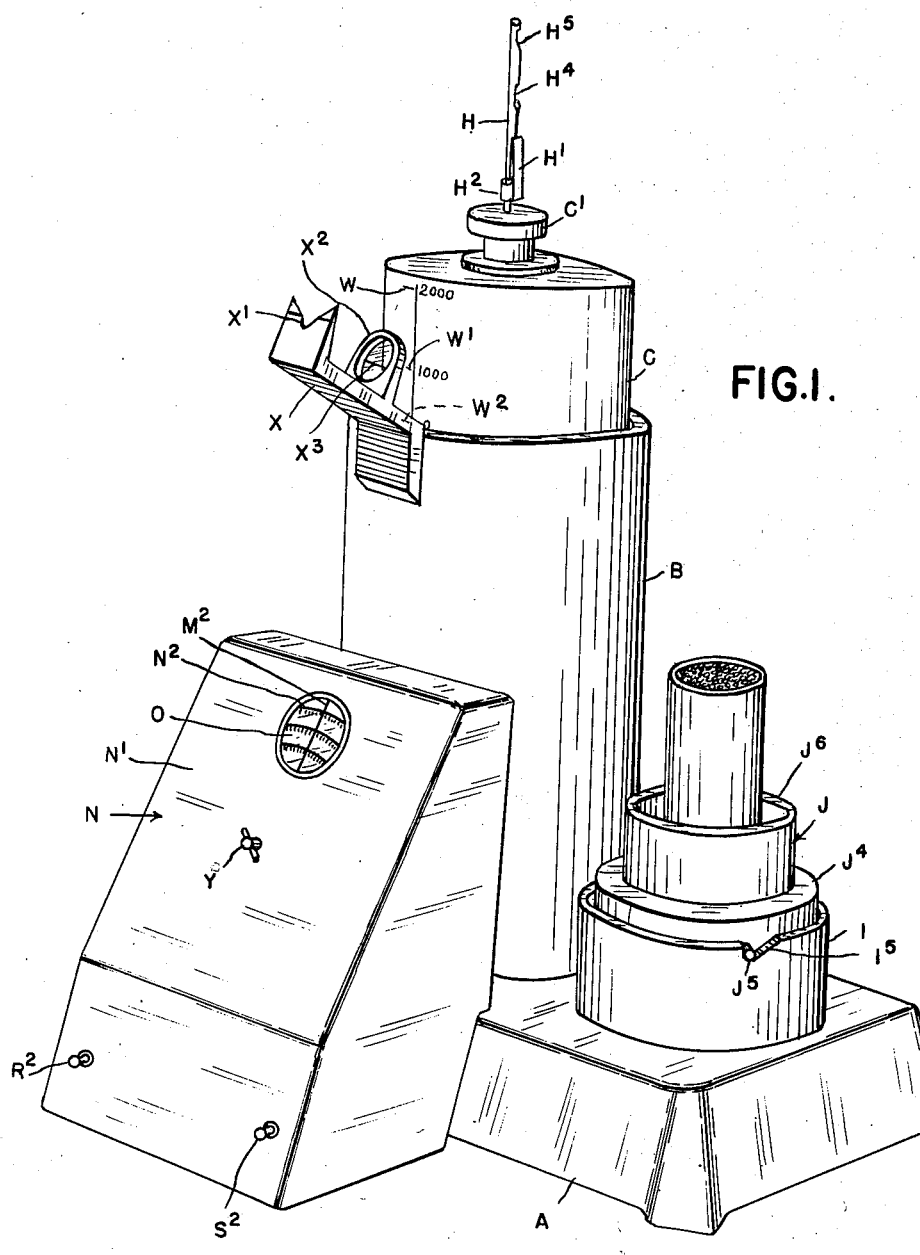
Fig. 1 is a perspective view illustrating our improved permeability meter.

As illustrated in Fig. 1, A is a suitable hollow base member having a cylindrical container B rising from one portion thereof forming the stationary member of a gasometer and C is the movable member or bell of said gasometer. D is a tube rising from the base A axially of the container B and E is a tube depending from the top of the bell C and telescopically engaging the tube D with sufficient clearance to minimize frictional resistance. The bell C is further provided with a weighted handle member C' centrally of its upper end and a weight E' is attached to the tube E by a set screw E². A smaller tube F passes through the member C' projecting into the tube D through the upper end thereof. Within the lower part of the tube F is arranged a rod G provided with head portions G' and G² of slightly larger diameter, respectively, at its upper and lower ends. The tube F has a threaded upper portion F' passing through the handle member C' and a nut F² engaging said portion serves as an adjusting means for raising or lowering the tube. At its lower end the tube F is provided with a bushing F³ which slideably engages a portion of the rod G between the heads G' and G² thereof. The arrangement is such that the bell C may be raised to a predetermined height without imparting movement to the rod G but if lifted higher than this point the bushing F³ engaging the head G' will lift the rod. Within the upper portion of the tube F and extending upward beyond the same is a rod H. This rod is variably positioned within the tube by means of a spring dog H' mounted on a collar H² on the upper end of the tube to be engageable with a plurality of notches H³, H⁴ and H⁵ in the rod. Adjacent to each of these notches is a flattened portion on the rod for receiving volume indicating numerals such, for instance, as 2000, 1000 and 400 representing volumes in cubic centimeters. The functions performed by the rods G and H are to operate electric switches hereinafter described which control the operation of a timing mechanism.

Air controlling means

Mounted on another portion of the base A is an air valve and specimen holding means of the following construction. I is a cup-shaped member mounted directly on the base and having therewithin a centrally apertured raised portion I' surrounded by an annular chamber I² for receiving a mercury seal. J is a member within the member I having a depending annular flange J' for dipping into the mercury seal and an inverted cup-shaped member J² supported by tie bars J³ for also dipping into the mercury seal but not to as great a depth. Above the flange J' is a portion J⁴ which loosely fits within a portion I³ of the member I and normally rests on the shoulder I⁴. A pin J⁵ projecting radially outward from the portion J⁴ normally engages a notch I⁵ in the portion I³, but when the member J is lifted to withdraw the pin J⁵ from the notch I⁵ and to rest it upon the upper edge of the portion I³ the lower edge of the cup J² will be withdrawn from the mercury seal. The member J is further provided with a cylindrical upwardly extending flange J⁶ for receiving the specimen tube and an inner concentric flange J⁷ forming between the same and the flange J⁶ an annular channel J⁸ for a second mercury seal. Thus the specimen tube when placed within the flange J⁶ will have its lower end sealed by the mercury within this channel J⁸. The members I and J together form an air valve which is opened when the member J is raised to disengage the cup J² from the mercury seal and is closed when said cup is lowered into the seal. Also the member J forms a seat for the test tube and a mercury seal between the same and the central passage within the portion I'. The latter passage is connected by a conduit K arranged within the hollow base to a vertically upwardly extending tube L within the casing B and bell C. Thus it is apparent that the weight of the bell C tending to lower the same causes the development of a predetermined air pressure therewithin which will cause a flow of air through the tubes L and K and passage within the member J to the lower end of the specimen containing tube such as M. As this tube is sealed within the member J the air will be forced to pass through the porous material within the tube M.

Timing means

The volume of air which is distributed from the gasometer through the sample tube M is accurately measured by the vertical distance through which the bell C is lowered. However the time required for passing such volume through the porous material within the specimen tube M depends upon the permeability of such material. It is evident therefore than an exact measurement of the time interval required to pass a predetermined volume of air through the specimen tube will also be an exact measurement of permeability. To avoid the necessity of mental calculations the timing mechanism is used to operate an indicator which is calibrated in standard units or permeability. Thus all that is required is to start and stop the operation of the timing mechanism at exactly spaced points in the descent of the bell.

The timing and indicating mechanism is preferably located in a separate housing N arranged at the side of the base A but normally mechanically connected thereto and having electrical connections between circuits in the respective housings. The housing N has an inclined front face portion N' and within the housing parallel to this face is a rotary dial O. The dial is driven by a stepped down transmission between the same and a synchronous electric motor P which may be operated by any available commercial current. The proportion of the parts is however such that the dial will be rotated through a predetermined angle in a predetermined interval of time. As the specific construction of the motor and transmission is not a part of the invention it is not shown in detail.

Controlling means

Figure 4:
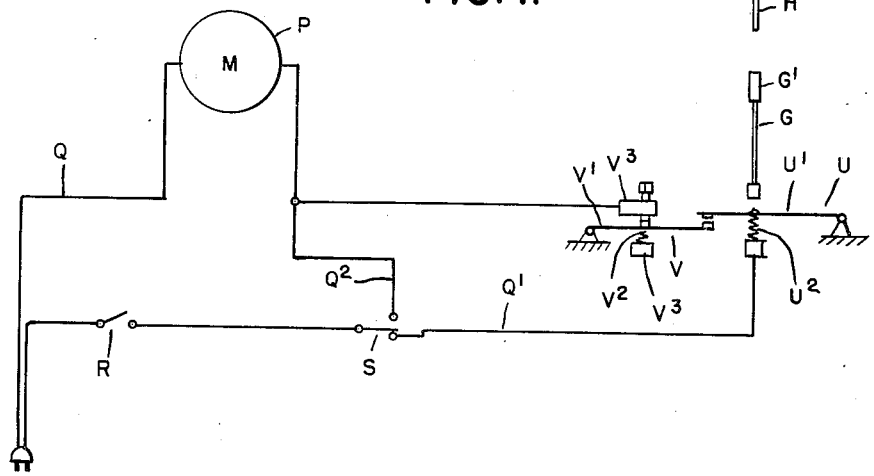
Fig. 4 is a diagram of the electric circuit.
Figure 5:
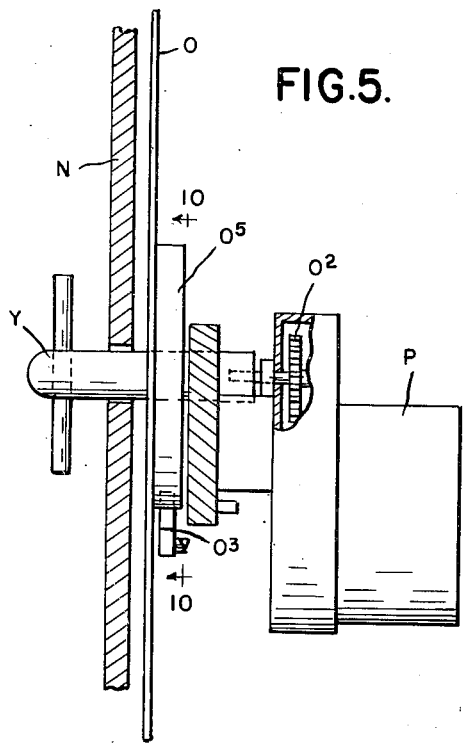
Fig. 5 is a plan view partly in section of the timing mechanism.
Figure 10:
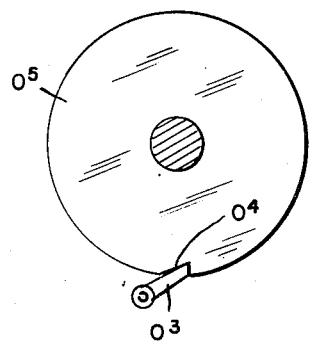
Fig. 10 is a section on line 10—10, Fig. 5.

The timing mechanism may be either automatically or manually controlled to start and stop the electric motor P. As diagrammatically illustrated in Fig. 4 the circuit Q for the motor P includes two manually operable switches R and S and automatically operated switches U and V. The switch U has one of its contacts carried at the free end of a pivoted lever U' which extends beneath and in alignment with the rod G, said lever being resiliently supported by a spring U². The cooperating contact of the switch U is upon a pivoted lever V' which also carries one of the contacts of the switch V and is resiliently supported by the spring V². The cooperating contact of the switch V is on a stationary block V³. The arrangement is such that the weight of the rod G resting upon the lever U' will be sufficient to move said lever against the resilient pressure of the spring U² so as to close the switch U. Also the resilient pressure on the spring V² is sufficient to hold the switch V closed against any displacement pressure of the rod G. However, when the bell C is raised sufficiently to engage the bushing F³ with the head G' this will relieve the weight of the rod G from the lever U' and permit the spring U² to open the switch U. Also when in the descent of the bell C the rod H contacts with the upper end of the rod G this will move downward both of the levers U' and V' thereby opening the switch V. It is thus apparent, first, that the lifting of the bell C sufficiently to move upward the rod G will open the switch U and de-energize the motor P. Second, that the lowering of the bell C sufficiently to rest the rod G upon the lever U' will close the circuit Q energizing the motor P. Third, that the lowering of the bell C sufficiently to press the rod H against the upper end of the rod G will open the switch V and deenergize the motor. Thus the motor and the timing mechanism actuated thereby will operate only during the interval between the closing of the switch U and the opening of the switch V, which represents the displacement of a predetermined volume of air by the gasometer, and the forcing of the same through the porous sample being tested.

Manual control

For certain tests it may be desirable to manually control the starting and the stopping of the timing mechanism. For this purpose the bell C is provided on the exterior surface thereof with markings indicating the volume of air displaced at different points in the descent of the bell. As shown the horizontal line W has adjacent thereto the number 2000, representing 2000 cubic centimeters of air. The line W' has opposite it 1000 and the line W² 0. Mounted on the front side of the container B is an inclined bracket member X provided at its outer end with a peek hole X' and at a lower point with a ring X² having a hair line X³ extending thereacross. This bracket is so positioned that the operator sighting through it the descending bell C can tell exactly when any one of the lines W, W', W² crosses the hair line X³. This enables him to close or open the electric circuit Q by operation of the manual switches R and S. The switch S is a double throw switch which in its "on" position closes the portion Q' of the circuit Q including the switches U and V. In the "off" position of this switch the circuit portion Q' is open and a shunt circuit Q² is closed. The switch R is a single throw switch in series with both the circuit portion Q' and the shunt Q² and which in its "off" position opens both of these circuits. Thus if it is desired to change from the automatic to the manual control the switch S is turned to its "off" position and the switch R is used for both manually closing and manually opening the circuit Q to respectively energize and de-energize the motor P. The switches R and S are operated, respectively, by the controls R² and S² located on the lower portion of the housing N where they can be manipulated by the operator while he is sighting the lines W, W' or W². This enables him to start or stop the motor at exact points in the descent of the bell so as to deliver an exactly measured volume of air to the test sample.

*Indicating means*

As previously described the timing mechanism drives a rotary dial O and a portion of this dial is displayed through a window opening N² in the housing N. The dial O is calibrated in standard units of permeability and is provided with a separate scale for each of the different volumes of air delivered by the gasometer to the test sample.

The general formula for permeability is $$\text{Perm.} = \frac{V \times h}{P \times A \times t}$$

in which V is the volume of gas, $h$ is the height of the specimen, P the pressure on the gas, A the cross sectional area of the specimen and $t$ the time. As a specific example the volume may be 2000 c. c. (122 cu. in.) of air, the height of the specimen 5.08 cm. (2 in.), the cross sectional area 20.268 sq. cm. (3.1416 sq. in.) and time 1 minute. The formula then becomes $$\text{Perm.} = \frac{501.2}{\text{grams pressure} \times \text{min.}}$$

In brief permeability is inversely proportional to time. The dial is rotated by the timing mechanism in a clockwise direction and three separate scales are arranged concentrically thereon, all displayed through the window and based, respectively, on volumes of 2000 c. c., 1000 c. c., and 400 c. c.

*Operation*

The rod H of the gasometer is adjusted to provide the particular volume of air desired for the test. For coarse sands the rod is adjusted to the top to engage the dog H' opposite the 2000 location. For medium sands the rod is adjusted to the 1000 mark and for fine sands to the 400 position. The gasometer bell is filled with air by first rotating the member J so as to engage the pin J⁵ with the upper edge of the portion I³ which will lift the cup J² above the mercury seal permitting air to pass through the space within the flange J⁷ under the cup J² and central passage in the member I' through the conduits K and L and into the bell. The bell is raised to a point where the bushing F³ on the tube F engages the head G' and lifts the rod H out of contact with the lever U'. Thus permitting the spring U² to raise said lever and open the switch U. The member J is then turned to lower the cup J² into the mercury seal which cuts off communication between the interior of the bell and the external atmosphere. The specimen to be tested, which is of a predetermined weight, is first rammed into the tube M after which said tube is placed in the member J to have its lower edge sealed in the mercury. The member J is then again adjusted to open position after which the weight of the bell C will cause a continuous discharge of air at constant pressure through the conduits L and K and passages within members I and J into the tube M and through the porous material contained therein. As soon as the bell lowers sufficiently to disengage the bushing F³ from the head G' the weight of the rod G will move the lever U' to close the switch U and energize the motor P. This through the time mechanism will drive the dial O in a clockwise direction until the rod H striking against the upper end of the rod G will depress both levers U' and V' opening the switch V and stopping the motor. The reading is then taken through the window N² which latter is provided with a vertical hair line M² for registration with the scales. To permit of resetting the dial to the zero point a friction clutch O² is placed between the same and the timing mechanism and a rotary handle Y on the external face of the housing N is connected to rotate the dial in a counterclockwise direction until the zero point is registered with the line M². This setting is rendered accurate by the engagement of a dog O³ with a notch O⁴ in the hub O⁵ of the dial.

Figure 6:
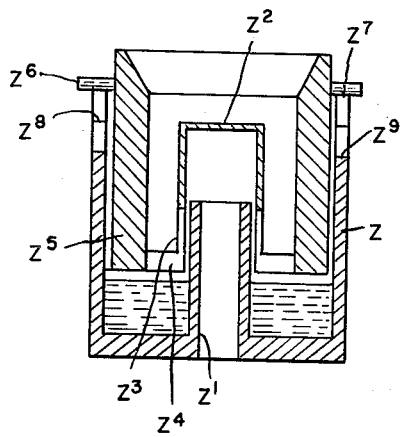
Fig. 6 is a vertical central section through a modified construction of air valve and specimen tube seal.
Figure 7:
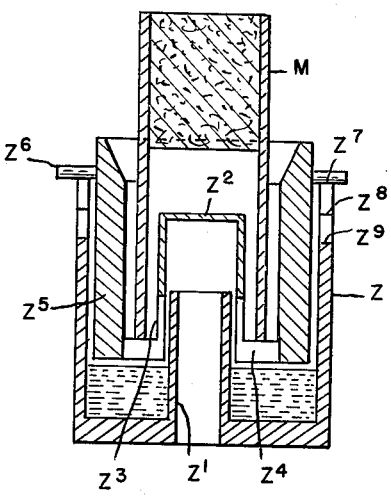
Figs. 7, 8 and 9 are similar views showing the parts in different positions of adjustment.
Figure 8:
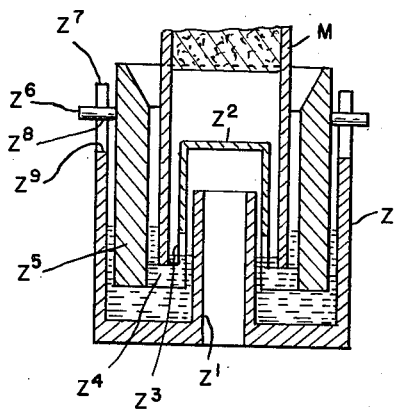
Figure 9:
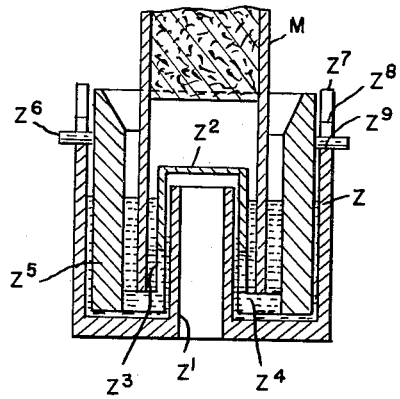

A modified construction of valve and specimen holder is illustrated in Figs. 6 to 9, inclusive, in which there are three different valve positions respectively labeled vent, read and closed. In specific construction Z is a cup corresponding to the cup I and provided with a central upwardly extending tube Z' which connects with the conduit K. Within the cup Z is an annular displacement member Z⁵ having diametrically opposite pins Z⁶ for alternatively resting upon the upper edge Z⁷ of the said cup, and for engaging notches Z⁸ and Z⁹. Z² is an inverted cup secured to the annular member Z⁵ by means of webs Z⁴ and Z³. Thus the cup Z² moves up and down with the annular member Z⁵ and may be held in three different elevations as shown in Figs. 7, 8 and 9, respectively, labeled vent, read and closed. Fig. 6 shows the valve in the same position as Fig. 7, but with the specimen tube removed.

In operation the specimen tube M containing the specimen may be placed in the holder as shown in Fig. 7, its lower end resting upon the webs Z⁴. In this position the bell may be raised and air will be taken in through the tube Z' which communicates with the atmosphere between the webs Z³ and Z⁴. As soon as the bell is raised the valve may be turned to the closed position, Fig. 9, wherein sufficient mercury is displaced to submerge the cup Z². When it is desired to perform the test the valve is turned to the read position, Fig. 8, wherein less mercury is displaced and the cup Z² rises above the mercury level. Thus the tube Z' communicates with the cavity beneath the specimen and the air consequently flows through the specimen. It will be observed that with this modified construction of air valve the same mercury cup is used for forming a seal for the lower end of the tube M and for opening and closing the air valve.

With our improved method and apparatus, as above described, it will be observed that the air or gas which is displaced and forced through the specimen is maintained at constant pressure at the entrance end of the specimen tube. Also that the passage of an exactly measured volume of gas through the specimen is timed. Consequently, time is the only variable and is inversely proportional to permeability. Another advantageous feature of the construction is the sighting means by which the operator can tell when a line on the gasometer passes a fixed point on the frame.

What we claim as our invention is:

1. In a permeability meter the combination with a holder for a specimen of predetermined dimensions, a gasometer in free communication with one end of said specimen, spaced markings on the bell of said gasometer for indicating a predetermined volume of gas therebetween, a timing mechanism and manually operable means for starting and stopping said timing mechanism, and sighting means located in an inclined plane and attached to the fixed member of the gasometer for accurately observing from a remote and higher point the registration of said markings with a fixed point whereby the observer can start and stop said timing mechanism at the respective registrations to time the passage of a predetermined volume of gas through said specimen.

2. In a permeability meter the combination with a gasometer for supplying gas under constant pressure and a specimen holder tube, of a valve between said gasometer and tube comprising a cup having a central raised portion with a gas passage therethrough, a volume of mercury surrounding said raised portion, an inverted cup-shaped member above said raised portion and means for relatively moving said inverted cup and mercury volume to alternatively seal and unseal the lower edge of said inverted cup.

3. In a permeability meter the combination with a gasometer for supplying gas under constant pressure and a specimen holder tube, of a means between said gasometer and tube for forming an air valve and an air seal for said tube, said means comprising a cup having a central raised portion with a gas passage therethrough, an inverted cup above said raised portion restricted in diameter to pass within said specimen tube when the latter is placed within said cup, a volume of mercury surrounding said raised portion for sealing the lower end of said specimen tube and a displacement member vertically adjustable within said cup to alternatively raise the mercury level to seal the lower edge of said inverted cup and to lower said level to provide gas connection between said central gas passage and the interior of said specimen tube.

4. A permeability meter comprising a holder for a specimen of predetermined dimensions, a gas chamber in free communication with one end of said specimen, a member movable in a downward direction for displacing gas from said chamber and through the specimen, electrically operated timing mechanism including an electric circuit having a normally open switch and a normally closed switch therein, a vertically movable element of predetermined weight supported by the gas displacement member for movement downward therewith but free therefrom, a yieldably supported member in the path of said element adapted to be depressed by the weight thereof, to close said normally open switch, a second member yieldably supported with greater resistance in the path of said first yieldably supported member for arresting movement thereof and said element, a second element movable with the gas displacement member initially spaced from said first element and adapted to contact therewith in the further downward movement of said displaced member to further depress said yieldably supported members and to thereby open said normally closed switch.

5. A permeability meter comprising a holder for a specimen of predetermined dimensions, a gas chamber in free communication with one end of said specimen, a member movable in a downward direction for displacing gas from said chamber and through the specimen, electrically operated timing mechanism including an electric circuit having a normally open switch and a normally closed switch therein, a vertically movable element of predetermined weight supported by the gas displacement member for movement downward therewith but free therefrom, a yieldably supported member in the path of said element adapted to be depressed by the weight thereof, to close said normally open switch, a second member yieldably supported with greater resistance in the path of said first yieldably supported member for arresting movement thereof and said element, a second element movable with the gas displacement member initially spaced from said first element and adapted to contact therewith in the further downward movement of said displaced member to further depress said yieldably supported members and to thereby open said normally closed switch, and means for adjusting one of the said elements to vary the space dimension between the same and the other of said elements and to correspondingly vary the volume of displaced gas.

6. A permeability meter comprising a holder for a specimen of predetermined dimensions, a gas chamber in free communication with one end of said specimen, a member movable in a downward direction for displacing gas from said chamber and through the specimen, electrically operated timing mechanism including an electric circuit having a normally open switch and a normally closed switch therein, a vertically movable element of predetermined weight supported by the gas displacement member for movement downward therewith but free therefrom, a yieldably supported member in the path of said element adapted to be depressed by the weight thereof, to close said normally open switch, a second member yieldably supported with greater resistance in the path of said first yieldably supported member for arresting movement thereof and said element, a second element movable with the gas displacement member initially spaced from said first element and adapted to contact therewith in the further downward movement of said displaced member to further depress said yieldably supported members and to thereby open said normally closed switch, and means for vertically adjusting the second element to vary the space dimension between the same and the first element and to correspondingly vary the volume of gas displaced.

7. A permeability meter comprising a holder for a specimen of predetermined dimensions, a gasometer in free communication with one end of said specimen and having a central tube extending upward through the bottom thereof to above the liquid level therein, a tube depending from the movable member of said gasometer and freely movable within the aforesaid tube, a rod of predetermined weight slidable within and having a shouldered engagement with said last mentioned tube to be supported thereby, electrically operated timing mechanism including an electric circuit having therein a normally open switch and a normally closed switch, a yieldably supported member in the path of said rod to be depressed by the weight thereof to close said normally open switch, a second member yieldably supported with greater resistance in the path of said first yieldably supported member for arresting movement thereof and said element, and a second rod within said depending tube adjustably spaced above said first rod and adapted in the further downward movement of the movable member of said gasometer to impinge against said first rod to further depress said yieldably supported members and to thereby open said normally closed switch.

HARRY W. DIETERT.
RALPH E. STEINMUELLER.
CARL M. KING.

REFERENCES CITED

The following references are of record in the file of this patent:

UNITED STATES PATENTS

| Number | Name | Date |
|---|---|---|
| 964,956 | Dezendorf | July 19, 1910 |
| 1,538,793 | Gallagher et al. | May 19, 1925 |
| 1,905,270 | Egy | Apr. 25, 1933 |
| 2,021,948 | Schopper | Nov. 26, 1935 |
| 2,104,047 | Long | Jan. 4, 1938 |
| 2,293,488 | Bays | Aug. 18, 1942 |
| 2,392,637 | Boehler | Jan. 8, 1946 |